(12) United States Patent
Wang et al.

(10) Patent No.: US 11,947,002 B2
(45) Date of Patent: Apr. 2, 2024

(54) METHOD FOR RECOGNIZING IDENTITY AND GESTURE BASED ON RADAR SIGNALS

(71) Applicant: ZHEJIANG UNIVERSITY, Hangzhou (CN)

(72) Inventors: Yong Wang, Hangzhou (CN); Junyi Chen, Zhejiang (CN); Jiahe Cao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 485 days.

(21) Appl. No.: 17/218,174

(22) Filed: Mar. 31, 2021

(65) Prior Publication Data

US 2021/0318427 A1 Oct. 14, 2021

Related U.S. Application Data

(63) Continuation of application No. PCT/CN2020/083989, filed on Apr. 9, 2020.

(51) Int. Cl.
*G01S 13/89* (2006.01)
*G01S 13/50* (2006.01)
(Continued)

(52) U.S. Cl.
CPC .......... *G01S 13/89* (2013.01); *G01S 13/505* (2013.01); *G01S 13/53* (2013.01); *G06F 3/017* (2013.01);
(Continued)

(58) Field of Classification Search
CPC ........ G01S 13/89; G01S 13/505; G01S 13/53; G06F 3/017; G06N 3/08; H04M 1/026
See application file for complete search history.

(56) References Cited

U.S. PATENT DOCUMENTS

2011/0221438 A1* 9/2011 Goodwill ............. A61B 5/0515
324/301
2016/0259037 A1* 9/2016 Molchanov ........... G01S 7/0233
(Continued)

FOREIGN PATENT DOCUMENTS

CN    106446828 A    2/2017
CN    106537173 A    3/2017
(Continued)

OTHER PUBLICATIONS

International Search Report (PCT/CN2020/083989); dated Jan. 5, 2021.
(Continued)

*Primary Examiner* — Bernarr E Gregory
*Assistant Examiner* — Hailey R Le
(74) *Attorney, Agent, or Firm* — W&G Law Group

(57) ABSTRACT

A method for recognizing an identity and a gesture based on radar signals includes: reading a radar echo signal reflected by various gestures of a tester and received by a radar sensor; frequency-mixing the radar echo signal with a radar transmission signal; after filtering and centralizing a frequency-mixed signal, training and obtaining a neural network capable of identity verification and a neural network capable of gesture recognition; in a real-time detection process, verifying an identity of a user; and if the identity is verified, determining that a gesture of the user is valid; verifying the gesture of the user and executing a corresponding operation according to correspondence between the gesture of the user and an operation. It can be determined by the method whether the gesture belongs to the corresponding user and whether the operation corresponding to the gesture is performed according to the determined result.

7 Claims, 3 Drawing Sheets

(51) Int. Cl.
  *G01S 13/53*     (2006.01)
  *G06F 3/01*      (2006.01)
  *G06F 21/32*     (2013.01)
  *G06N 3/08*      (2023.01)
  *H04M 1/02*      (2006.01)
  *H04M 1/72463*   (2021.01)

(52) U.S. Cl.
  CPC ............... *G06F 21/32* (2013.01); *G06N 3/08* (2013.01); *H04M 1/026* (2013.01); *H04M 1/724631* (2022.02)

(56) References Cited

U.S. PATENT DOCUMENTS

| | | | | |
|---|---|---|---|---|
| 2020/0371204 | A1* | 11/2020 | Connolly | G06F 3/017 |
| 2020/0408908 | A1* | 12/2020 | Donovan | G01S 7/4816 |
| 2021/0141082 | A1* | 5/2021 | Moshe | G01S 13/89 |
| 2021/0190526 | A1* | 6/2021 | Choi | G06V 20/58 |
| 2021/0226810 | A1* | 7/2021 | Peng | G06F 3/011 |

FOREIGN PATENT DOCUMENTS

| | | | |
|---|---|---|---|
| CN | 107024685 A | * | 8/2017 |
| CN | 107024685 A | | 8/2017 |
| CN | 108344995 A | | 7/2018 |
| CN | 108469611 A | | 8/2018 |
| CN | 109188414 A | | 1/2019 |
| CN | 109271838 A | | 1/2019 |
| CN | 110456320 A | | 11/2019 |
| CN | 110765974 A | | 2/2020 |

OTHER PUBLICATIONS

"Two-Stream Fusion Neural Network Approach for Hand Gesture Recognition Based on FMCW Radar" (Jul. 31, 2019) [Wang Yong et al.]

* cited by examiner

METHOD FOR RECOGNIZING IDENTITY AND GESTURE BASED ON RADAR SIGNALS

TECHNICAL FIELD

The present disclosure relates to the field of identity recognition and, in particular, to a method for recognizing an identity and a gesture based on radar signals.

BACKGROUND

Gesture recognition refers to an entire process of tracking human gestures, recognizing their representations, and converting the representations into semantically meaningful commands. As an important part of human-computer interaction, the gesture recognition is researched and developed, which affects naturalness and flexibility of the human-computer interaction. With the development of technology at this stage, applications of using the gesture recognition on various devices are increasing.

In traditional gesture recognition, a camera is usually used to collect gesture information, resulting in a certain degree of waste in energy consumption. In addition, the gesture images contain a huge amount of information, making it prone to have privacy issues such as information leakage. Moreover, in the currently gesture recognition, before a device is unlocked, an additional identity verification method is often required to control whether the device is unlocked, and the gesture recognition can be performed only after the device is successfully unlocked. Thus, the steps are relatively cumbersome. In addition, when the device is unlocked, anyone who makes the same gesture on the device can produce the same effect, and this leads to a certain risk.

Therefore, a problem needs to be solved urgently is that gesture recognition, as well as identity verification, performs on the device at the same time, to improve convenience and security of gesture recognition.

SUMMARY

In view of this, an object of the present disclosure is to provide a method for recognizing an identity and a gesture based on radar signals, so as to solve the technical problems that an additional unlocking step is required in gesture recognition and the same effect can be produced by anyone making the same gesture on the device after the device is unlocked.

To solve the above technical problems, following technical solutions are provided according to the present disclosure. A method for recognizing an identity and a gesture based on radar signals includes following steps:

Step 1, reading a radar echo signal reflected by various gestures of a tester and received by a radar sensor;

Step 2, frequency-mixing the radar echo signal with a radar transmission signal;

Step 3, filtering a frequency-mixed signal by a high-pass filter;

Step 4, performing a centralization operation on filtered signal data;

Step 5, determining a neural network model suitable for features of radar signals, training the model by using a preprocessed signal in the Step 4 and an identity information label of the tester, to obtain a neural network A for identity verification;

Step 6, obtaining distance information, speed information and angle information according to the preprocessed signal in the Step 4 and parameters of the radar sensor, to calculate three-dimensional coordinates and Doppler values of a moving target;

Step 7, dividing space above a radar in a space grid method; mapping a spatial area into a three-dimensional matrix; determining a grid position where the moving target is located in the space, according to the three-dimensional coordinates obtained in the Step 6; accumulating the Doppler values obtained in the Step 6 at a matrix unit corresponding to the grid position, as a size of an element of the matrix unit; training a designed neural network by the matrix and a gesture information label, to obtain a neural network B for gesture recognition;

Step 8, performing a constant false alarm rate detection on the radar echo signal detected in real time, to determine whether a gesture recognition is performed; and if the gesture recognition is performed, proceeding to the Step 9; else, continuing to wait for detection;

Step 9, performing preprocessing of the Steps 2 to 4 on the detected radar echo signal; sending the processed signal to the neural network A trained in the Step 5, to extract features for analysis; verifying the identity of a user through identity information contained in the features; and if the identity is verified, determining that the gesture of the user is valid and proceeding to Step 10, otherwise continuing to wait for detection; and Step 10, performing a processing of the Steps 6 and 7 on the data preprocessed in the Steps 2 to 4; and inputting the processed data to the neural network B, to determine a gesture of a user and perform a corresponding operation according to a correspondence between the gesture of the user and an operation.

Further, the radar sensor adopts a FMCW millimeter-wave radar having a frequency range of 57.4 GHz to 62.6 GHz.

Further, in the Step 2, in a case that the radar sensor has a plurality of receiving channels, a plurality of obtained corresponding waveforms are averaged and then filtered.

Further, in the Step 3, the frequency-mixed signal is filtered by an eighth-order Butterworth high-pass filter having a cutoff frequency of 31250 Hz, to filter out large direct current and low-frequency noise and retain valid information.

Further, in the Step 6, the distance information R is obtained through a fast time dimension FFT, according to the preprocessed signal in the Step 4 and the parameters of the radar sensor:

$$f_{movingBeat} \approx f_{staticBeat} = \frac{2f_c R}{Ct_c}$$

$$R = \frac{Ct_c}{2f_c} \times f_{staticBeat};$$

the speed information v is obtained through a slow time dimension FFT:

$$f_d = \frac{2fv}{C}$$

$$v = \frac{f_d C}{2f},$$

where $f_{movingBeat}$ and $f_{staticBeat}$ are frequencies of beat signals when a target is in motion and static states respectively, $f_d$ is a Doppler frequency, $f_c$ is a span, R is a distance to the target, C is a speed of light, $t_c$ is a frequency sweep period, f is a center frequency of a Chirp signal, and v is a speed of the target; and the angle information θ is obtained according to a plurality of transmitting and receiving antennas of the radar sensor:

$$\Delta\Phi = \frac{2\pi\Delta d}{\lambda}$$

$$\theta = \sin^{-1}\left(\frac{\lambda\Delta\Phi}{2\pi L}\right)$$

where Δd is a distance difference between any two receiving antennas and the target, ΔΦ is a phase difference of signals received by two corresponding antennas, L is a distance between the two corresponding antennas, and X is a wavelength.

Further, in the Step 7, an area having a space size of Xcm*Ycm*Zcm is mapped into a three-dimensional matrix having a size of (X*k1)*(Y*k2)*(Z*k3), where X, Y, Z are length, width and height of the space, and k1, k2, and k3 are mapping coefficients of length, width and height of an actual space to the three-dimensional matrix.

Further, a valid user establishes the correspondence between prescribed gestures and operations in a training processing; in a case that a specific gesture of the valid user is recognized as a prescribed gesture in the Step 10, an operation corresponding to the prescribed gesture is executed; and in a case that the recognized gesture is not the prescribed gesture, no operation is generated.

Further, the method is applied to a phone, a radar sensor is built in the phone, identity information and gesture information of a device owner is pre-stored in the phone, and part of the gesture information corresponds to App operation instructions. In a case that the phone is locked, if a person for performing an identity verification by a gesture is the device owner, the phone is unlocked, the gesture information is determined, and an App corresponding to the gesture is started. If there is no corresponding gesture, no operation is executed. If the gesture does not belong to the device owner, the phone remains locked. In the case where the mobile phone is unlocked, if the gesture does not belong to the device owner or the gesture of the device owner is not the prescribed gestures, the corresponding operation is not executed.

The present disclosure has following beneficial effects. In the method for recognizing the identity and the gesture based on radar signals according to the present disclosure, a radar is used to collect signals, to effectively reduce energy consumption and ensure user privacy. On the premise of performing the gesture operation only once, it can be determined whether the gesture belongs to the corresponding user and further determined whether the operation corresponding to the gesture is performed according to the determined result. This method greatly improves the convenience and safety of the gesture recognition.

DESCRIPTION OF EMBODIMENTS

The specific implementation manners of the embodiments of the present disclosure will be described in detail below with reference to the accompanying drawings. It should be understood that the specific implementations described here are only used to illustrate and explain the embodiments of the present disclosure but not used to limit the embodiments of the present disclosure.

Without loss of generality, a method for recognizing an identity and a gesture based on radar signals is provided according to an embodiment of the present disclosure. A FMCW millimeter-wave radar with a frequency range of 57.4 GHz to 62.6 GHz is used. A frame rate of a transmitted signal is 60 frames per second, and each frame of data is divided into 8 Chirp signals. A total of 21 people were subjected to the method for recognizing the identity and the gesture based on radar signals.

Figure 1:
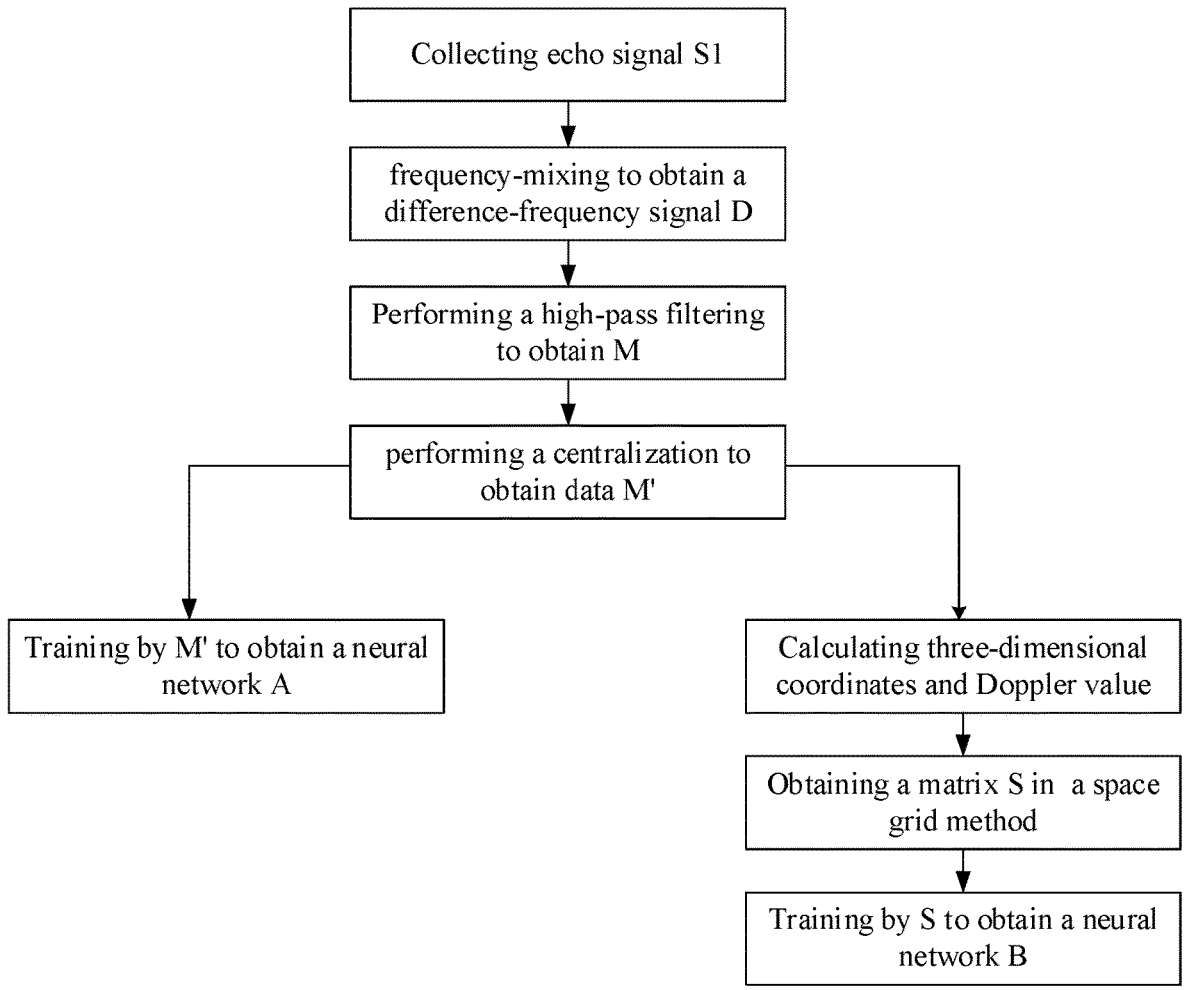
FIG. 1 is a flowchart of offline training of identity and gesture recognition based on radar signals.

A flow of offline training part is shown in FIG. 1, which mainly includes following steps.

Figure 2:
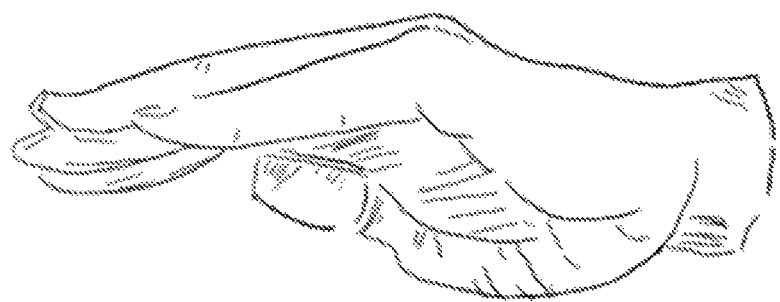
FIG. 2 shows a usage manner of a millimeter wave radar sensor.

In Step 1, a radar sensor is placed on a flat surface. A tester makes prescribed N gestures and interference gestures (the interference gestures are gestures other than the N gestures) above the radar sensor according to a manner shown in FIG. 2. A radar echo signal obtained through reflection of various gestures and received by the radar sensor is read, which is denoted as $S_1$.

In Step 2, frequency-mixing is performed on the radar echo signal $S_1$ and a radar transmission signal $S_2$, to obtain a frequency-mixed signal $D(t)=\sin[(\omega_1-\omega_2)t+(\varphi_1-\varphi_2)]$, where $\omega_1$ and $\omega_2$ respectively represent frequencies of the transmission signal and the signal reflected by a palm, $\varphi_1$ and $\varphi_2$ respectively represent phases of the two signals, and the frequency-mixed signal is denoted as D. A millimeter-wave radar used in this example has multiple receiving channels. Thus, multiple corresponding waveforms can be obtained, and an average of multiple waveforms is taken, to denote an obtained signal as D'.

In Step 3, an eighth-order Butterworth high-pass filter having a cutoff frequency of 31250 Hz is used to filter the signal D' to obtain signal data M, and the filter is selected to mainly filter out relatively large direct-current and low-frequency noise while retaining valid information.

In Step 4, a centralization operation is performed on the filtered signal data M'=M−μ, and an average of the data is $\mu=1/n\times\Sigma_{i=0}^n M_i$, where n is a size of amount of data.

In Step 5, a neural network model suitable for features of the radar signal is designed (an input layer of the neural network needs to be adapted to parameters of collected data preset by the radar). The preprocessed signal M' and an identity information label of the tester are sent into the neural network for training, to obtain a neural network A capable of identity verification.

In Step 6, distance information R is obtained through a fast time dimension FFT, according to M' and parameters of the radar sensor, $$f_{movingBeat} \approx f_{staticBeat} = \frac{2f_c R}{Ct_c}$$

$$R = \frac{Ct_c}{2f_c} \times f_{staticBeat};$$

speed information v is obtained through a slow time dimension FFT, $$f_d = \frac{2fv}{C}$$

$$v = \frac{f_d C}{2f},$$

where $f_{movingBeat}$ and $f_{staticBeat}$ are frequencies of beat signals when a target is in motion and static states respectively, $f_d$ is a Doppler frequency, $f_c$ is a snap, R is a distance to the target, C is a speed of light, $t_c$ is a frequency sweep period, f is a center frequency of a Chirp signal, and v is a speed of the target; and angle information θ is obtained according to a plurality of transmitting and receiving antennas of the radar sensor:

$$\Delta\Phi = \frac{2\pi\Delta d}{\lambda}$$

$$\theta = \sin^{-1}\left(\frac{\lambda\Delta\Phi}{2\pi L}\right)$$

where Δd is a distance difference between any two receiving antennas and the target, ΔΦ is a phase difference of signals received by two corresponding antennas, L is a distance between the two corresponding antennas, and λ is a wavelength. Finally, three-dimensional coordinates (x, y, z) and Doppler values of the moving target are derived, according to the distance information R, the speed information v and the angle information θ.

In Step 7, a space above the radar is divided in a space grid method.

An area having a space size of Xcm*Ycm*Zcm is mapped into a three-dimensional matrix having a size of (X*k1)*(Y*k2)*(Z*k3), where X, Y, Z are length, width and height of the space, and k1, k2, and k3 are mapping coefficients of length, width and height of the actual space to the three-dimensional matrix. Specifically, an actual space of 20 cm*20 cm*10 cm can be selected and mapped to a three-dimensional matrix of 20*20*10 (that is, a 1 $cm^3$ spatial grid corresponds to one element unit in the matrix).

For the data (the three-dimensional coordinates and the corresponding Doppler values) obtained in Step 6, the Doppler values are accumulated at a matrix unit corresponding to the grid, based on a grid position in the space to which it belongs, as the size of the element of the matrix unit. The matrix S and the gesture information label are sent to the designed neural network to obtain a neural network B capable of gesture recognition.

Figure 3:
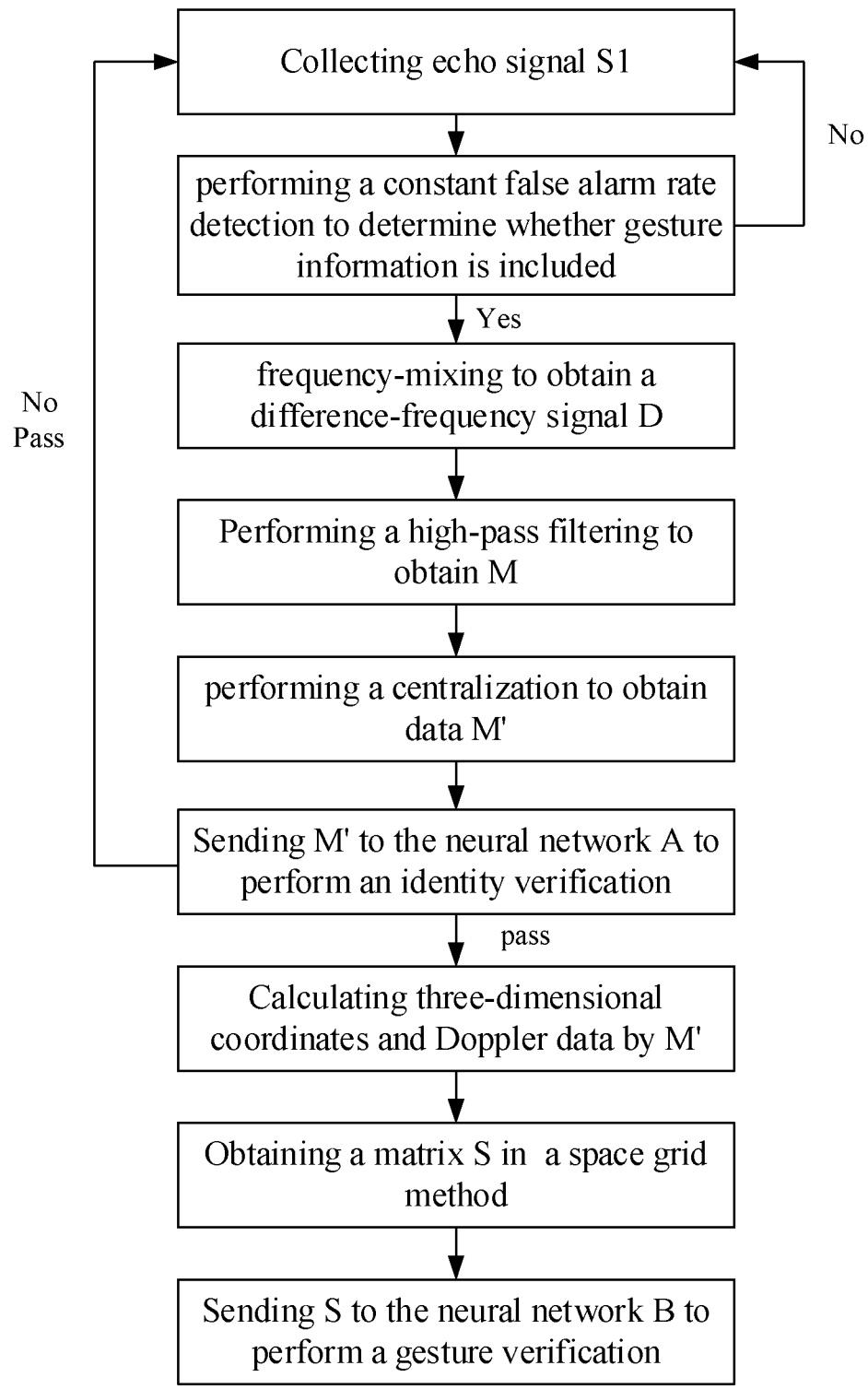
FIG. 3 is a flowchart of online recognition of identity and gesture recognition based on radar signals.

A flow of online recognition part is shown in FIG. 3, which mainly includes following steps.

In Step 8, a constant false alarm rate detection is performed on the detected radar echo signal, to determine whether gesture recognition is performed; and if the gesture recognition is performed, the method proceeds to the Step 9; else, the method continues to wait for detection.

In Step 9, preprocessing of the Steps 2 to 4 above is performed on the detected radar echo signal; the processed signal is sent to the neural network A trained in step 5, to extract features for analysis; an identity of a user is verified through identity information contained in the features; and if the identity verification is passed (a classification result of the neural network on the information is a classification of an identified valid user), the gesture of the user is valid and the method proceeds to Step 10; otherwise the method continues to wait for detection.

In Step 10, a processing of the Steps 6 and 7 is performed on the data preprocessed in the Steps 2 to 4; and then the processed data is sent to the neural network B, to determine what kind of gesture the user has made and to perform subsequent corresponding operations. If the gesture is not anyone of the pre-defined N gestures, no operation will be generated.

An application scenario of starting an App on a phone terminal is given below, but it is not limited to this.

A radar sensor is built in the phone, and identity information and gesture information of a device owner is pre-stored in the phone. Part of the gesture information corresponds to App operation instructions. On a premise that the phone is locked, if a person for performing an identity verification by a gesture is the device owner, the phone is unlocked, the gesture information is determined, and an App corresponding to the gesture is started. If there is no corresponding gesture, no operation is executed. If the gesture does not belong to the device owner, the phone remains locked. In the case where the mobile phone is unlocked, if the gesture does not belong to the device owner or the gesture made by the device owner is not the prescribed gestures, the corresponding operation will not be executed. Identity verification and gesture recognition can work simultaneously through one gesture. In this way, an entire process for recognizing the identity and the gesture based on radar signals is completed. After many experiments, it is proved that the method according to the present disclosure can achieve a recognition accuracy of about 90%.

In summary, in the method for recognizing the identity and the gesture based on radar signals according to the present disclosure, a radar is used to collect signals, to effectively reduce energy consumption and protect user privacy. After a series of effective preprocessing, the neural network is used to extract features, and it can be determined whether the gesture belongs to the corresponding user and further determined whether the operation corresponding to the gesture is performed according to the determined result, so that this method improves security of gesture recognition. The entire process does not require additional unlocking steps, and the gesture operation is only required once, which also makes the gesture recognition more convenient.

The above content is a further detailed description of the present disclosure in conjunction with specific preferred embodiments, and it cannot be considered that the specific embodiments of the present disclosure is limited to these descriptions. For those of ordinary skill in the technical field to which the present disclosure belongs, several simple deductions or substitutions can be made without departing from the concept of the present disclosure, and they should be regarded as falling into the protection scope of the present disclosure.

What is claimed is:

1. A method for recognizing an identity and a gesture based on radar signals, including following steps:

Step 1, reading a radar echo signal reflected by various gestures of a tester and received by a radar sensor;

Step 2, frequency-mixing the radar echo signal with a radar transmission signal;

Step 3, filtering a frequency-mixed signal by a high-pass filter;

Step 4, performing a centralization operation on filtered signal data;

Step 5, determining a neural network model suitable for features of the radar signal, training the model by using a preprocessed signal in the Step 4 and an identity information label of the tester, to obtain a neural network A for identity verification;

Step 6, obtaining distance information, speed information and angle information, according to the preprocessed signal in the Step 4 and parameters of the radar sensor, to calculate three-dimensional coordinates and Doppler values of a moving target;

Step 7, dividing space above a radar in a space grid method; mapping a spatial area into a three-dimensional matrix; determining a grid position where the moving target is located in the space, according to the three-dimensional coordinates obtained in the Step 6; accumulating the Doppler values obtained in the Step 6 at a matrix unit corresponding to the grid position, as a size of an element of the matrix unit; training a designed neural network by the matrix and a gesture information label, to obtain a neural network B for gesture recognition;

Step 8, performing a constant false alarm rate detection on the radar echo signal detected in real time, to determine whether a gesture recognition is performed; and if the gesture recognition is performed, proceeding to the Step 9; otherwise continuing to wait for detection;

Step 9, performing a preprocessing of the Steps 2 to 4 on the detected radar echo signal; sending the processed signal to the neural network A trained in the Step 5, to extract features for analysis; verifying an identity of a user through identity information contained in the features; and if the identity is verified, determining that the gesture of the user is valid and proceeding to Step 10, otherwise continuing to wait for detection; and Step 10, performing a processing of the Steps 6 and 7 on the data preprocessed in the Steps 2 to 4, and inputting the processed data to the neural network B, to determine a gesture of a user and to perform a corresponding operation according to a correspondence between the gesture of the user and an operation, wherein in the Step 6, the distance information R is obtained through a fast time dimension FFT, according to the preprocessed signal in the Step 4 and the parameters of the radar sensor:

$$f_{movingBeat} \approx f_{staticBeat} = \frac{2f_c R}{Ct_c}$$

$$R = \frac{Ct_c}{2f_c} \times f_{staticBeat};$$

the speed information v is obtained through a slow time dimension FFT:

$$f_d = \frac{2fv}{C}$$

$$v = \frac{f_d C}{2f},$$

wherein $f_{movingBeat}$ and $f_{staticBeat}$ are frequencies of beat signals when a target is in motion and static states respectively, $f_d$ is a Doppler frequency, $f_c$ a span, R is a distance to the target, C is a speed of light, $t_c$ is a frequency sweep period, f is a center frequency of a Chirp signal, and v is a speed of the target; and the angle information θ is obtained according to a plurality of transmitting and receiving antennas of the radar sensor:

$$\Delta\Phi = \frac{2\pi\Delta d}{\lambda}$$

$$\theta = \sin^{-1}\left(\frac{\lambda\Delta\Phi}{2\pi L}\right)$$

wherein Δd is a distance difference between any two receiving antennas and the target, ΔΦ is a phase difference of signals received by two corresponding antennas, L is a distance between the two corresponding antennas, and λ is a wavelength.

2. The method for recognizing the identity and the gesture based on radar signals according to claim 1, wherein the radar sensor adopts a FMCW millimeter-wave radar having a frequency range of 57.4 GHz to 62.6 GHz.

3. The method for recognizing the identity and the gesture based on radar signals according to claim 1, wherein in the Step 2, in a case that the radar sensor has a plurality of receiving channels, a plurality of obtained corresponding waveforms are averaged and then filtered.

4. The method for recognizing the identity and the gesture based on radar signals according to claim 1, wherein in the Step 3, the frequency-mixed signal is filtered by an eighth-order Butterworth high-pass filter having a cutoff frequency of 31250 Hz, to filter out large direct-current and low-frequency noise and retain valid information.

5. The method for recognizing the identity and the gesture based on radar signals according to claim 1, wherein in the Step 7, an area having a space size of Xcm*Ycm*Zcm is mapped into a three-dimensional matrix having a size of (X*k1)*(Y*k2)*(Z*k3), wherein X, Y, Z are length, width and height of the space, and k1, k2, and k3 are mapping coefficients of length, width and height of an actual space to the three-dimensional matrix.

6. The method for recognizing the identity and the gesture based on radar signals according to claim 1, wherein a valid user establishes the correspondence between prescribed gestures and operations in a training processing; in a case that a specific gesture of the valid user is recognized as a prescribed gesture in the Step 10, an operation corresponding to the prescribed gesture is executed; and if the recognized gesture is not the prescribed gesture, no operation is generated.

7. The method for recognizing the identity and the gesture based on radar signals according to claim 1, wherein the method is applied to a phone, a radar sensor is built in the phone, identity information and gesture information of a device owner is pre-stored in the phone, and part of the gesture information corresponds to App operation instructions; in a case that the phone is locked, if a person for performing an identity verification by a gesture is the device owner, the phone is unlocked, the gesture information is determined, and an App corresponding to the gesture is started; if there is no corresponding gesture, no operation is executed; if the gesture does not belong to the device owner, the phone remains locked; in a case that the mobile phone is unlocked, if the gesture does not belong to the device owner or the gesture of the device owner is not the prescribed gesture, a corresponding operation will not be executed.

* * * * *